(12) United States Patent  
Lesartre et al.

(10) Patent No.: US 12,269,410 B2  
(45) Date of Patent: Apr. 8, 2025

(54) VEHICLE SEAT PROVIDED WITH AN INSTALLED SAFETY SYSTEM

(71) Applicants: RENAULT S.A.S, Boulogne Billancourt (FR); NISSAN MOTOR CO., LTD., Kanagawa-ku (JP)

(72) Inventors: François Lesartre, Guyancourt (FR); Nicolas Renaud, Guyancourt (FR); Jean-Baptiste Roy, Guyancourt (FR); Philippe Souville, Guyancourt (FR)

(73) Assignees: RENAULT S.A.S, Boulogne Billancourt (FR); NISSAN MOTOR CO., LTD., Kanagawa-ku (JP)

( * ) Notice: Subject to any disclaimer, the term of this patent is extended or adjusted under 35 U.S.C. 154(b) by 0 days.

(21) Appl. No.: 18/684,700

(22) PCT Filed: Jul. 21, 2022

(86) PCT No.: PCT/EP2022/070555  
§ 371 (c)(1),  
(2) Date: Feb. 19, 2024

(87) PCT Pub. No.: WO2023/025482  
PCT Pub. Date: Mar. 2, 2023

(65) Prior Publication Data  
US 2025/0026296 A1    Jan. 23, 2025

(30) Foreign Application Priority Data  
Aug. 26, 2021  (FR) ..................... 21 08954

(51) Int. Cl.  
*B60R 21/207*    (2006.01)  
*B60R 21/231*    (2011.01)  
(Continued)

(52) U.S. Cl.  
CPC ...... *B60R 21/207* (2013.01); *B60R 21/23138* (2013.01); *B60R 21/2338* (2013.01);  
(Continued)

(58) Field of Classification Search  
CPC ........ B60R 2021/23386; B60R 21/207; B60R 21/23138; B60R 22/26; B60R 2021/23146  
See application file for complete search history.

(56) References Cited

U.S. PATENT DOCUMENTS

| | | | |
|---|---|---|---|
| 10,189,432 B2 * | 1/2019 | Matsushita | .......... B60N 2/4235 |
| 11,560,114 B2 * | 1/2023 | Lee | ..................... B60R 21/2338 |

(Continued)

FOREIGN PATENT DOCUMENTS

| | | |
|---|---|---|
| JP | 2007-276514 A | 10/2007 |
| WO | WO 2021/111748 A1 | 6/2021 |

OTHER PUBLICATIONS

International Search Report issued Nov. 10, 2022 in PCT/EP2022/070555, filed on Jul. 21, 2022, citing documents 15-16 therein, 2 pages.

(Continued)

*Primary Examiner* — Faye M Fleming  
(74) *Attorney, Agent, or Firm* — Oblon, McClelland, Maier & Neustadt, L.L.P.

(57) ABSTRACT

A vehicle seat includes a backrest, a seat pan, and an airbag having two components placed on sides of the seat. Each component includes an airbag cushion and a strap sewn to the airbag cushion. The strap is fixed to an upper area of the backrest and an anti-submarining hump of the seat pan. The backrest includes a seat cushion and a rigid shell surrounding the seat cushion. Each strap passes between the seat cushion and the shell. The seat includes a seat belt provided with a retractor fixed to the backrest and placed inside a (Continued)

Figure 1:
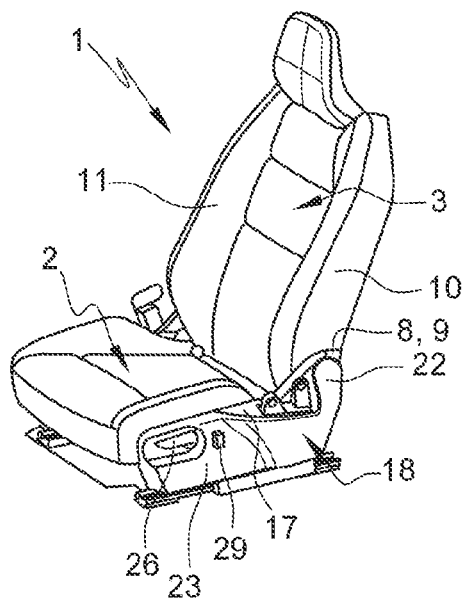

receiving portion delimited by a front casing located in a backrest upper area, the shell covers the front casing, thereby forming a space between them to pass the strap of one of the two components in the backrest upper area, and the shell delimiting the receiving portion to the rear.

10 Claims, 10 Drawing Sheets

(51) Int. Cl.
    *B60R 21/2338*     (2011.01)
    *B60R 22/26*     (2006.01)

(52) U.S. Cl.
    CPC .... *B60R 22/26* (2013.01); *B60R 2021/23146* (2013.01); *B60R 2021/23386* (2013.01)

(56) References Cited

U.S. PATENT DOCUMENTS

| | | | |
|---|---|---|---|
| 11,590,920 B2* | 2/2023 | Schneider | B60R 21/233 |
| 11,912,230 B2* | 2/2024 | Faruque | B60R 21/207 |
| 11,938,887 B2* | 3/2024 | Saito | B60R 21/207 |
| 12,109,924 B2* | 10/2024 | Matsushita | B60R 21/237 |

OTHER PUBLICATIONS

French Preliminary Search Report issued May 16, 2022 in FR Application 21 08954, filed on Aug. 26, 2021, citing documents 15-16 therein, 3 pages (with English Translation of Categories of Cited Documents).

* cited by examiner

VEHICLE SEAT PROVIDED WITH AN INSTALLED SAFETY SYSTEM

The invention relates to a vehicle seat provided with an inbuilt safety system.

In order to simplify the text, it is always assumed that the airbag is only deployed in the event of an accidental impact of the vehicle against an external obstacle, which may for example be another vehicle. It will thus not be specified each time that the deployment of the airbag occurs only after an impact of the vehicle.

In order to properly understand the positioning of the various parts involved in a seat according to the invention, the description assumes that the seat is placed in a vehicle and with reference to a direct orthonormal reference system XYZ which is associated with this vehicle and in which X is a front-rear longitudinal axis of the vehicle, oriented toward the rear, Y is a transverse axis oriented toward the right of the vehicle, and Z is a vertical axis directed upward.

At present, the frontal airbag placed in the dashboard just in front of the passenger seat is very restrictive, since it takes up a lot of space within said dashboard.

One solution for resolving this placement problem consists in directly and completely relocating this airbag to the passenger seat. However, such relocation requires that the new airbag placed in said seat:
- exhibits protective characteristics at least equivalent to those of the old passenger airbag placed in the dashboard,
- is mounted precisely and meticulously in the passenger seat in order that it can deploy smoothly in the desired configuration, without an element already present in said seat impeding or preventing the deployment of this new airbag.

Some existing seats already comprise simple airbags placed on either side of the seat in addition to the one disposed in the dashboard, and their performance thus complements that of the airbag disposed in the dashboard. However, these airbags require a predetermined positioning of the seat in relation to the dashboard, and this is a restriction in the case of autonomous vehicles, for which the passenger seats are made to move or pivot to a great extent.

In order to make these seats completely autonomous in respect of safety, in the context for example of autonomous vehicles, a seat belt system is fully integrated therein. However, full integration of a seat belt and a full and sophisticated airbag system in such seats is complicated, since the seat belt must not unfavorably interfere with the airbag system, as this risks disrupting or even preventing the deployment thereof in the event of an accidental impact of the vehicle against an external obstacle.

A seat according to the invention comprises an airbag that performs well and is able to effectively protect an individual who would be seated on said seat in the event of an impact of the vehicle against an external obstacle, and a seat belt system which is just as effective with respect to this individual, said airbag and said seat belt system being fully integrated in said seat without interfering with one another to the point of mutually undermining their functions.

A subject of the invention is a vehicle seat comprising a structure of a backrest, a structure of a seat pan having an anti-submarining hump, and an airbag having two components placed on the sides of said seat on either side of an individual who would be seated thereon.

According to the invention,
- each component of the airbag comprises an airbag cushion and at least one strap sewn to said airbag cushion, said component being able deploy toward the front of the seat in the event of an impact of the vehicle, such that said components are made to completely surround the individual,
- said at least one strap of each component has a top fixing point for fixing to an upper area of the structure of the backrest and a bottom fixing point for fixing to the anti-submarining hump of the structure of the seat pan, and said at least one strap of each component is routed along one side of the structure of the backrest and along one side of the structure of the seat pan,
- the structure of the backrest comprises a seat cushion and a rigid shell surrounding said seat cushion and being open at the front, such that said at least one strap of each component passes on one side of the structure of the backrest between said seat cushion and said rigid shell, the seat comprising a seat belt fully integrated therein and provided with a retractor fixed to the structure of the backrest and placed inside a receiving portion delimited by a front casing located in an upper area of said structure of the backrest, the rigid shell at least partially covering said front casing, thereby forming a space between them to enable the passage of said at least one strap of one of the two components in the upper area of the structure of the backrest, said shell delimiting said receiving portion to the rear.

The airbag implemented in a seat according to the invention comprises two components disposed on either side of an individual who would be seated on said seat, said two components being each made to deploy to the front in the event of an impact of the vehicle so as to completely surround this individual. The particular feature of this airbag is that each of its components comprises an airbag cushion and at least one strap sewn to this airbag cushion, said at least one strap making it possible:
- to anchor the component of the airbag in the seat by means of a top fixing point in an upper area of the backrest and by means of a bottom fixing point in an anti-submarining hump of the seat,
- to guide the deployment of the airbag cushion on the seat in order that this airbag cushion ensures good protection of the individual who would be seated on said seat.

The rigid shell surrounding part of the backrest makes it possible to hold said at least one strap of each component of the airbag against the seat cushion, and also allows the airbag to deploy to the front of the backrest in the inflation phase such that the two components of the airbag can fully surround an individual who would be seated on said seat.

The other particular feature of a seat according to the invention is that it comprises a seat belt which is fully integrated therein, and which comprises a retractor intended to tension the seat belt in the event of an impact of the vehicle against an external obstacle.

The shell of the backrest extends as far as the casing of the seat belt which encloses the retractor, thereby at least partially covering it. This shell is placed around said casing, thereby forming therewith a space for the passage of said at least one strap of one of the two components of the airbag. Said at least one strap is thus placed around the casing that receives the retractor. In this way, if the vehicle is involved in an accident, said at least one strap will be able to deploy to the front of the seat at the same time as the airbag cushion in the inflation phase, without being disrupted by the presence of the retractor. Similarly, by being placed above the casing that receives the seat belt retractor, said at least one strap will not prevent the seat belt from performing its function of retention against said seat.

To summarize, the principle of a seat according to the invention is that it comprises:
- a fully integrated airbag that performs particularly well as a result of being suitable for completely surrounding a passenger who would be seated on said seat in the event of an accident, and
- a seat belt system which is also fully integrated.

These two safety elements are mounted in said seat so as to not interfere with one another and not disrupt the function of the other element.

According to one possible feature of the invention, the shell comprises a rear wall intended to be placed against a rear surface of the seat cushion, two lateral edges intended to be placed against two lateral edges of the seat cushion, thereby surrounding said at least one strap of each component, and an upper edge intended to be placed on the front casing that encloses the retractor for the seat belt, creating a passage for said at least one strap of one of the two components in the upper area of the structure of the backrest. This shell makes it possible both to cover said at least one strap of each component of the airbag on the sides of the backrest and in an upper zone thereof in spite of the presence of the front casing that receives the seat belt retractor, and to ensure the deployment of said straps to the front when the cushion of the airbag is in the inflation phase. Another task of the shell is to fully cover said at least one strap of each component of the airbag, to improve the visual appearance of the seat.

According to one possible feature of the invention, the front casing of the seat belt comprises a groove intended for the passage of said at least one strap of one of the two components, the shell comprising a flat segment covering said groove in which said at least one strap is placed. This groove makes it possible to hold said at least one strap on the front casing, thereby limiting the ways said at least one strap can slide thereon.

According to one possible feature of the invention, the width of the groove is slightly greater than that of said at least one strap such that said at least one strap is placed in said groove with a minimum of play. In this way, the groove ensures a good retaining function for retaining said at least one strap of one of the components of the airbag while still allowing said strap to be able to shift therein. The strap is thus not caught in the groove and can deploy easily if the vehicle is involved in an accident. A minimum of play means a play of a few millimeters, which can reach 1 cm.

According to one possible feature of the invention, the backrest comprises a main surface against which an occupant's back is intended to rest, and two lateral uprights framing said main surface and intended to laterally hold this occupant's back, the front casing being located in an upper area of one of the two lateral uprights. This front casing is off-center on the seat and thus does not risk coming to rest against an individual who would be seated on said seat. This individual will not be inconvenienced by the presence of this front casing, and will thus be able to easily handle that portion of the seat belt which exits this casing.

According to one possible feature of the invention, the lateral upright in which the front casing is located was shortened beforehand such that the total length of said upright and said front casing is equal to the total length of the other upright. In this way, the casing does not create a protuberance, which would be likely to annoy an individual who would be seated on the seat and which would adversely affect the esthetics of the vehicle. The seat provided with the casing thus has a visual symmetry, displaying no sign that it comprises an electric retractor.

According to one possible feature of the invention, the front casing has a front face having an opening to allow a portion of the seat belt to exit said front casing to the front.

According to one possible feature of the invention, the opening takes the shape of a cross, comprising a slot of which the length is greater than the width of the seat belt portion emerging from the front casing to allow said portion to emerge from said slot. A slot is a discreet and inconspicuous opening which leaves only a little play for the portion of the seat belt that passes through it. In this way, the front casing will not be easily clogged by dust external to the seat. The cross comprises a vertical secondary slot leading into the slot, so as to make it possible to insert the seat belt into the casing when the seat is being mounted.

According to one possible feature of the invention, the front casing is closed such that the motorized retractor for the seat belt is not visible from outside the seat. The expression "the casing is closed" means that it does not have any opening other than that formed by the cross.

Another subject of the invention is a vehicle comprising at least one seat according to the invention.

A vehicle seat according to the invention has the advantage of having an enveloping airbag intended to fully effectively and self-sufficiently ensure the safety of a passenger who would be seated on said seat, without having been extensively restructured. Specifically, sensible mounting of the airbag on the seat by means of a limited number of parts of simple design suffices to make said seat perform particularly well in terms of safety. The result is that a seat according to the invention can allow existing parts to be reused, without needing to extensively modify said seat. A seat according to the invention moreover has the advantage of completely integrating a seat belt, the particular mounting of which prevents said belt from interfering with the components of the airbag. In other words, the airbag and the seat belt do not interfere with one another and do not exert any negative influence on one another. A seat according to the invention is particularly, but not exclusively, suitable for an autonomous vehicle, since it has, built into it, all the safety elements for safeguarding a passenger who would be seated on said seat.

Figure 2:
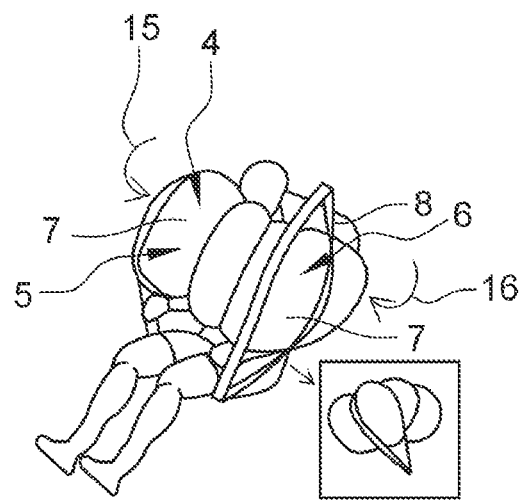
Figure 3:
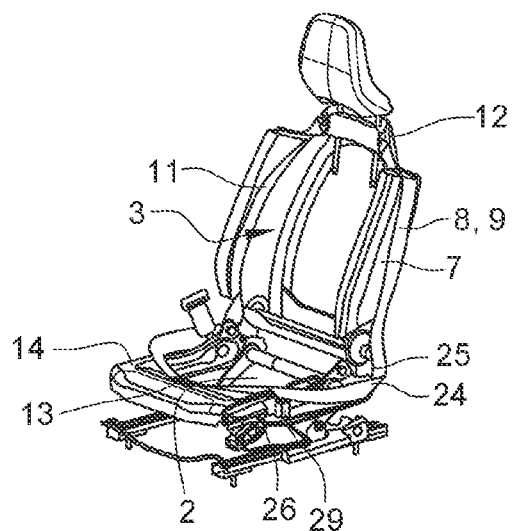
Figure 4:
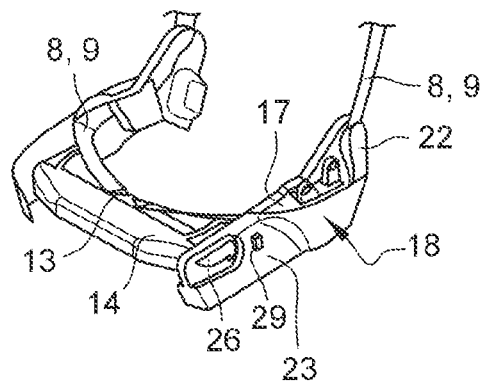
Figure 5:
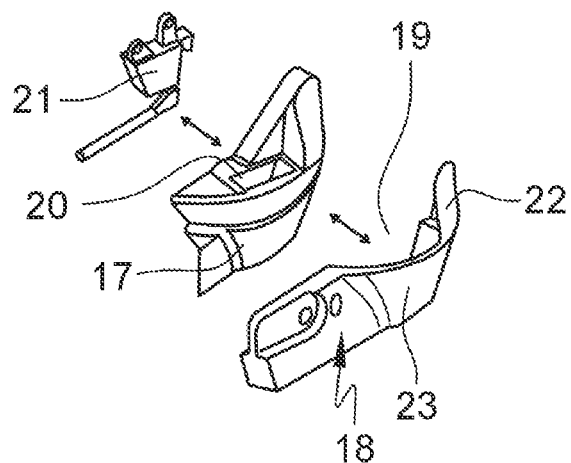
Figure 6:
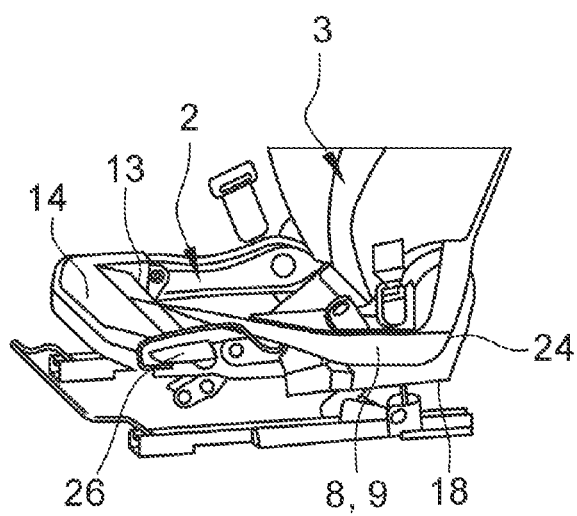
Figure 7:
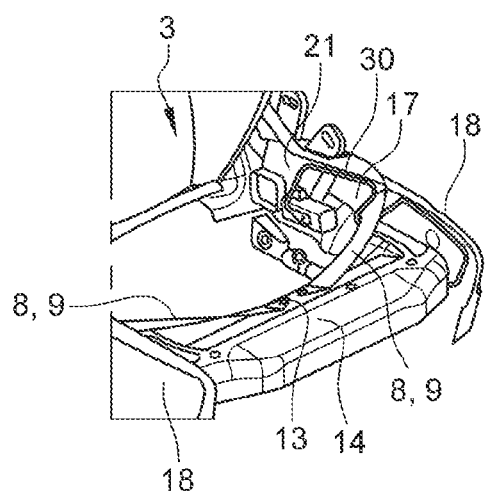
Figure 8:
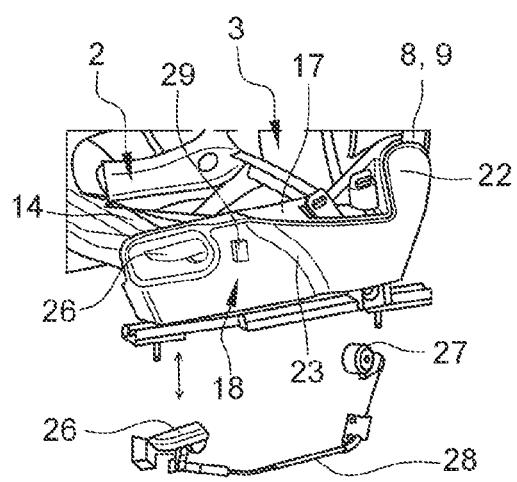
Figure 9:
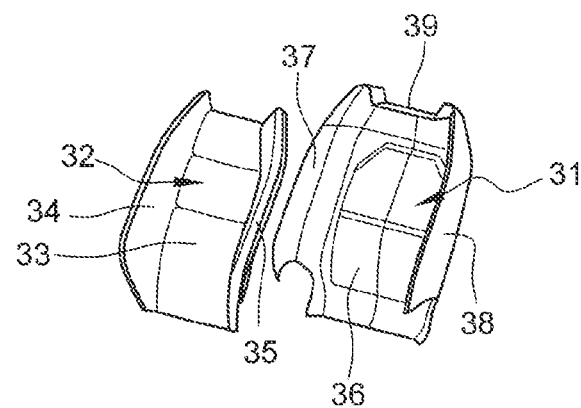
Figure 10:
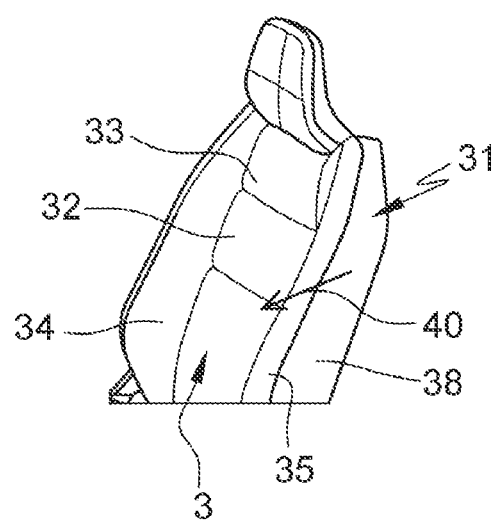
Figure 11:
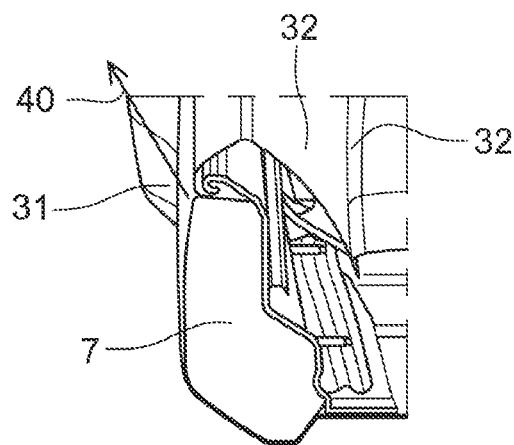
Figure 12:
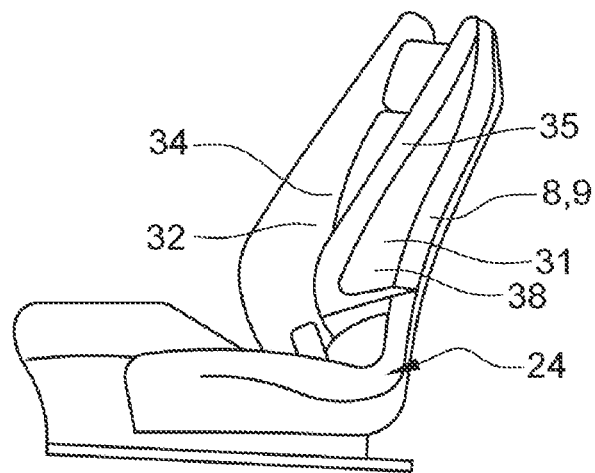
Figure 13:
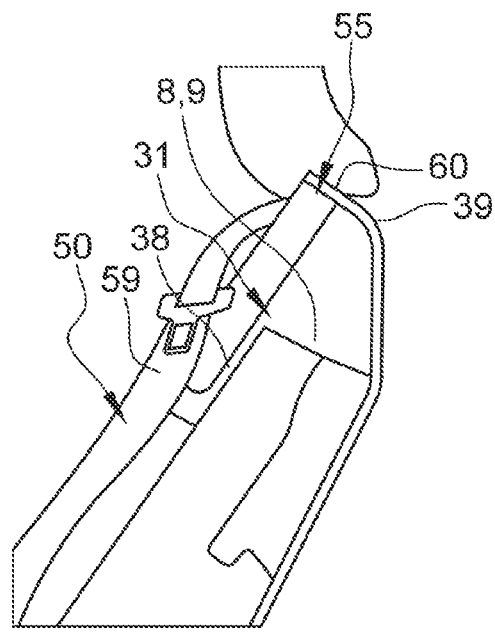
Figure 14:
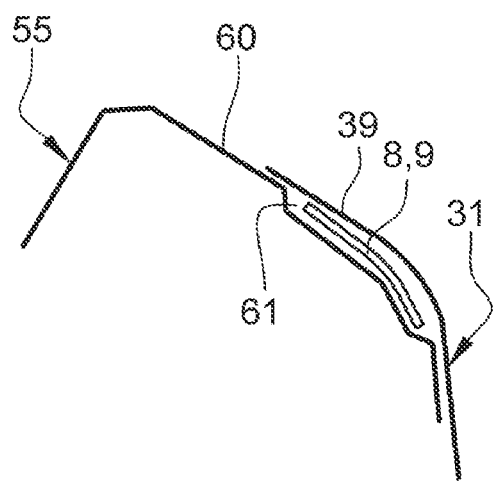
Figure 15:
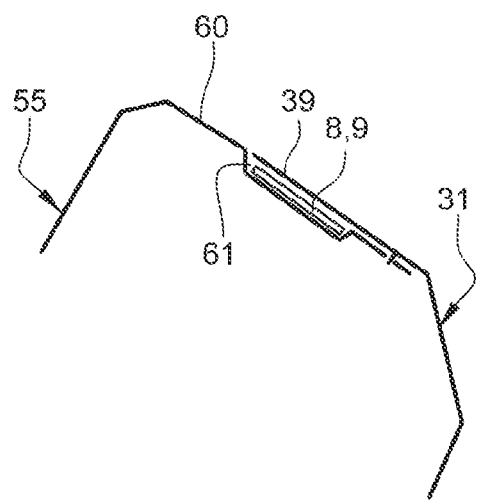
Figure 16:
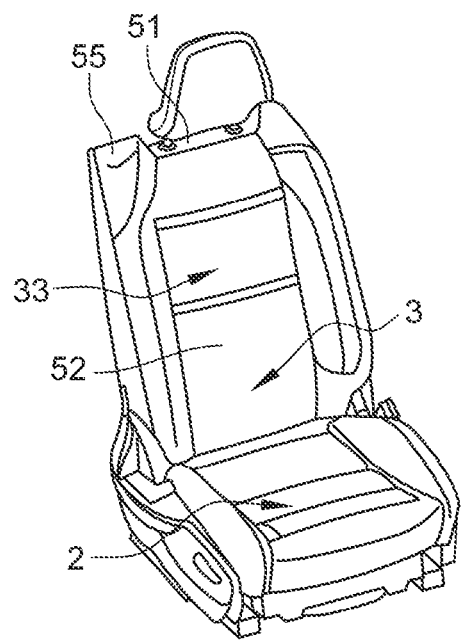
Figure 17:
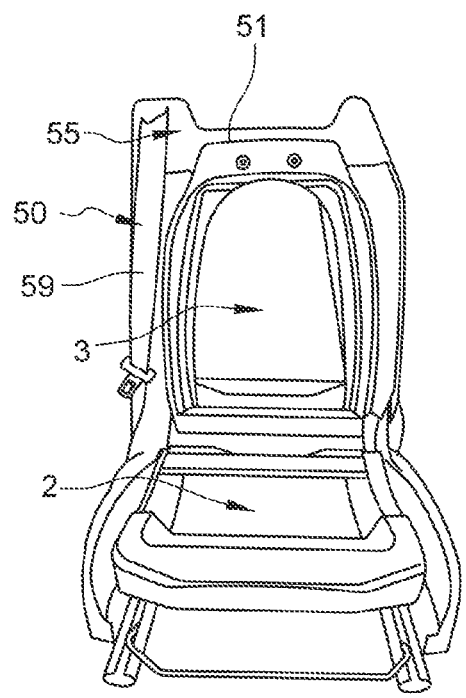
Figure 18:
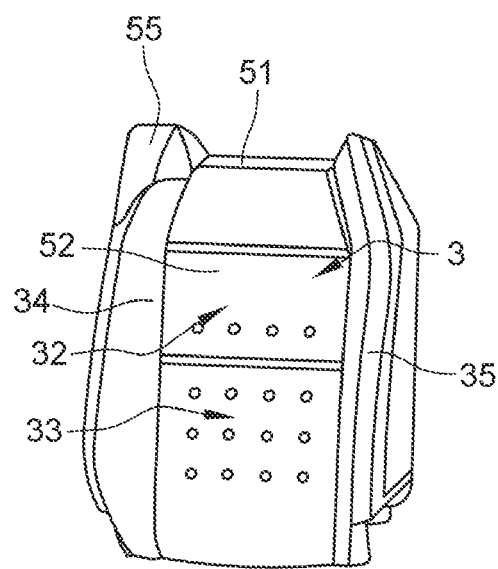
Figure 19:
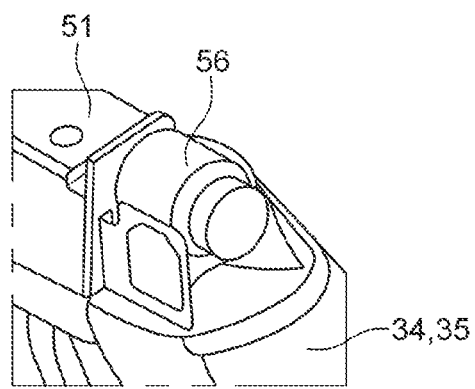
Figure 20:
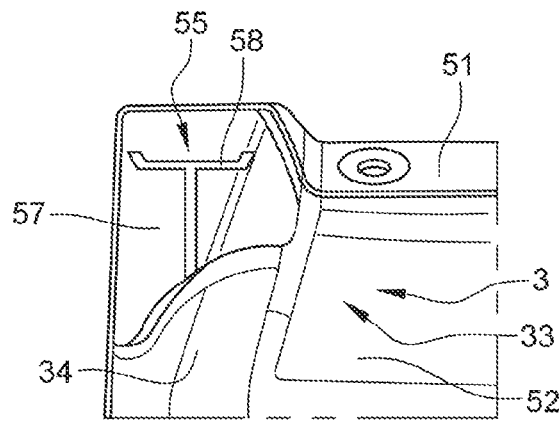

There follows a detailed description of a preferred embodiment of a seat according to the invention, with reference to the following figures:

FIG. 1 shows a perspective view of a seat according to the invention,

FIG. 2 shows a perspective view of an airbag for a seat according to the invention, in a configuration deployed on the seat, FIG. 3 shows a perspective view of the structure of the seat in FIG. 1, FIG. 4 shows a partial perspective view of a structure of a seat pan for a seat according to the invention, FIG. 5 shows an exploded perspective view of an inner casing and an outer casing of a structure of a seat pan for a seat according to the invention, FIG. 6 shows a partial perspective view at a different angle of the structure of the seat pan in FIG. 4, FIG. 7 shows a partial perspective view of a structure of a seat pan for a seat according to the invention, showing an angle change wire for a strap of the airbag, FIG. 8 shows a side view of a structure of a seat pan for a seat according to the invention, comprising a backrest tilt control handle, FIG. 9 shows an exploded perspective view of a backrest for a seat according to the invention, FIG. 10 shows a perspective view of the assembled backrest in FIG. 9, FIG. 11 shows a perspective view of a lateral area of a backrest for a seat according to the invention, FIG. 12 shows a side view of a seat according to the invention, showing the positioning of an airbag strap along one side of said seat, FIG. 13 shows a side view of an upper area of a backrest for a seat according to the invention, FIG. 14 shows a simplified sectional view of the upper area in FIG. 10 along a first sectional plane, FIG. 15 shows a simplified sectional view of the upper area in FIG. 10 along a second sectional plane, FIG. 16 shows a perspective view of a front face of a seat according to the invention, showing the casing that receives an electric retractor, FIG. 17 shows a front view of the seat in FIG. 13, FIG. 18 shows a front view of the backrest for a seat according to the invention, FIG. 19 shows a see-through, perspective view of an upper area of a backrest for a seat according to the invention, showing an electric retractor for a seat belt, FIG. 20 shows a front view of an upper area of a backrest for a seat according to the invention, showing a front face of a casing intended to receive an electric retractor for a seat belt.

With reference to FIG. 1, a seat 1 according to the invention is preferably a passenger seat conventionally comprising a seat pan 2 provided with a structure and a backrest 3 also provided with a structure.

With reference to FIG. 2, a first particular feature of such a seat 1 is that it integrates an airbag 4, intended to replace the passenger airbag usually received in a dashboard of the vehicle, just in front of the passenger seat. Schematically, this airbag 4 comprises two separate components 5, 6, each having an airbag cushion 7 and two straps 8, 9 sewn to this airbag cushion 7. The two components 5, 6 of this airbag 4 are stowed in the seat 1, on each side 10, 11 thereof, such that they are placed on either side of an individual who would be seated on said seat 1. In other words, these two components 5, 6 flank an individual who would be seated on said seat 1 and are aligned along a transverse axis Y of the vehicle in which said seat 1 would be mounted. Since these two components 5, 6 are substantially identical, in the rest of the description only a single one of these components 5, 6 will be described.

With reference to FIG. 3, when a component 5, 6 of the airbag 4 is stowed in the seat 1, the two straps 8, 9 are superposed and comprise a top fixing point for fixing to a central upper area 12 of the structure of the backrest 3, and a bottom fixing point for fixing to a central area 13 of an anti-submarining hump 14 of the seat pan 2. The airbag cushion 7 is inserted in one side of the backrest 3, so as to not be visible from outside said seat 1. The two superposed straps 8, 9 extend between their top fixing point and their bottom fixing point, passing along the sides of the backrest 3 and the sides of the seat pan 2 without ever being visible from outside said seat 1.

With reference to FIG. 2, in the event of an accidental impact of the vehicle against an external obstacle, which may for example be another vehicle, the two components 5, 6 of the airbag 4 deploy simultaneously to the front, as indicated by the two arrows 15, 16, so as to completely encircle an individual who would be seated on the seat 1. Specifically, during this deployment the two inflated airbag cushions 7 of the two components 5, 6 continue one another so as to form a continuous protective band around the individual. The deployment of each component 5, 6 of the airbag 4 is caused by the inflation of the airbag cushion 7 and is guided by the two straps 8, 9 that are sewn to said airbag cushion 7 and are fixed to both the structure of the backrest 6 and the structure of the seat pan 2. When a component 5, 6 of the airbag 4 deploys, the top fixing point and the bottom fixing point of the two straps 8, 9 remain unchanged, and continue to retain said two straps 8, 9. Once the individual has been completely surrounded by the two airbag cushions 7 of the two components 5, 6 of the airbag 4, they will be perfectly protected in all spatial directions.

In order that the two components 5, 6 of the airbag 4 can play their protective role to perfection, it is important to integrate them well in the seat 1, such that they can deploy smoothly and effectively in the desired direction without interfering with further elements of said seat. Specifically, the integration of the two components 5, 6 of the airbag 4 in the seat 1 should not prevent, for example, the operation of a seat belt, or elements of said seat 1 should not be able to adversely affect the deployment of said components 5, 6.

A seat 1 according to the invention has a seat pan 2 specially configured to integrate the two components 5, 6 of the airbag 4. The structure of the seat pan 2 is schematically delimited by two longitudinal parallel edges extending along a longitudinal axis X of the vehicle, and by two transverse parallel edges extending along a transverse axis Y of said vehicle.

With reference to FIGS. 4 and 5, each longitudinal edge of the structure of the seat pan 2 is embodied by an inner casing 17 and by an outer casing 18. The inner casing 17 and the outer casing 18 are parts with a small thickness that can be inscribed in a substantially vertical and longitudinal plane XZ of the vehicle. Along a transverse axis Y of the vehicle, the two outer casings 18 represent the two outermost parts of the seat pan 2, each inner casing 17 being inserted between an outer casing 18 and a central area of the seat pan 2 on which an individual is intended to sit. The outer casing 18 extends along a longitudinal axis X of the vehicle and has a recessed area 19, the inner casing 17 having a length less than that of the outer casing 18, the length being its dimension as considered along a longitudinal axis X of the vehicle. The inner casing 17 has a curvature and is intended to come into contact with the wall of the outer casing 18 delimiting the recessed area 19.

With reference to FIGS. 4 and 6, once the inner casing 17 has been pressed against an internal surface of the outer casing 18, it forms with said outer casing 18 a passage through which the two superposed straps 8, 9 of the corresponding component 5, 6 of the airbag 4 pass. The inner casing 17 comprises an opening 20 intended to receive a specific housing 21 for accommodating either a seat belt buckle or an anchoring means for said seat belt. In this way, since the two superposed straps 8, 9 of the airbag 4 pass between the inner casing 17 and the outer casing 18, they are on the outside of said seat belt buckle and thus do not risk interfering with the seat belt. Similarly, said seat belt will not prevent the two superposed straps 8, 9 of the airbag 4 from deploying in the event of an impact of the vehicle against an external obstacle.

With reference to FIGS. 1, 4, 5 and 8, the outer casing 18 has an end segment 22 extending perpendicularly to a main body 23 of said casing, said end segment 22 continuing the backrest 3 and being intended to conceal the two superposed straps 8, 9 of the airbag 4, between said backrest 3 and the seat pan 2 of the seat 1.

As shown in FIGS. 3 and 6, between the backrest 3 and the seat pan 2, the two superposed straps 8, 9 of the airbag 4 have a fold 24 of substantially 90°, that is to say 90° plus or minus 10°. This preliminary fold at 90° is necessary to appropriately prevent the appearance of a fold which could prove dangerous during the deployment of the two superposed straps 8, 9 of the airbag 4. Specifically, the conditions of deployment of the two superposed straps 8, 9 of the airbag 4 in the seat 1 are such that the preliminary fold of 90° will disappear, to give way to smoothed-out and uniform airbag straps 8, 9 which thus do not have any bend at all, as illustrated in FIG. 2.

With reference to FIG. 3, like most of the backrests of existing vehicle seats, the backrest 3 of a seat 1 according to the invention can be adjusted in terms of tilt. It is mounted rotatably about an axis of rotation 25 extending along a transverse axis Y of the vehicle and placed in a lower area of the structure of the backrest 3. With passage along the sides of the backrest 3 and the sides of the seat pan 2, the two superposed straps 8, 9 of a component 5, 6 of the airbag 4 go via this axis of rotation 25. In other words, if said axis of rotation 25 were artificially continued on each side, the two superposed straps 8, 9 of the airbag 4 would pass through the artificial continuations of said axis of rotation 25. In this way, by going via the axis of rotation 25 of the backrest 3, the two superposed straps 8, 9 of the airbag 4 do not prevent said backrest 3 from rotating about said axis 25 to adjust its tilt. However, the two superposed straps 8, 9 of the airbag 4 cover a mechanism for rotating and positioning the backrest 3 that is conventionally placed in the continuation of the axis of rotation 25 of the backrest 3, impeding any handling of this mechanism.

With reference to FIGS. 3, 4 and 8, in order to address this impediment, a control element 26 for this mechanism 27 has been created and then placed in a front zone of one of the two outer casings 18 of the seat pan 2 of the seat 1. This control element consists of a handle 26 extending by default along a horizontal longitudinal axis X of the vehicle, said handle 26 connecting the mechanism 27 for rotating and positioning the backrest 3 by means of a wire 28. This wire 28 is hidden by the outer casing 18, and manual rotation of the control handle 26 exerts tension on the wire 28, which acts directly on the mechanism 27 in order to be able to adjust the tilt of the backrest 3.

Similarly, the two superposed straps 8, 9 of the airbag 4 cover a mechanism for raising the seat pan 2 and impede any height adjustment of said seat pan 2.

With reference to FIGS. 1, 3 and 4, this problem of access to the mechanism for raising the seat pan 2 has been addressed by adding an electric motor to this mechanism and associating a control button 29 with this electric motor. This control button is a pushbutton 29 which is fixed in the outer casing 18 supporting the control handle 26, said pushbutton 29 being placed behind said handle 26.

With reference to FIG. 7, a rigid angle-change wire 30 is fixed to the structure of the seat pan 2 inside an inner casing 17, so as to improve the positioning of the two superposed straps 8, 9 of the airbag 4 in the passage located between the inner casing 17 and the outer casing 18. Specifically, the two superposed straps 8, 9 of the airbag 4 go around this rigid wire 30 and bear against it, so as to form a bend, said rigid wire 30 straightening out the two superposed straps 8, 9 of the airbag in order that they are optimally inserted in the passage created between the inner casing 17 and the outer casing 18. In other words, this rigid wire 30 continues the straightness of the two superposed straps 8, 9 of the airbag 4 into the passage located between the inner casing 17 and outer casing 18.

With reference to FIGS. 9, 10, 11, 12 and 13, the airbag cushion 7 and a section of the superposed straps 8, 9 sewn to said airbag cushion 7 are placed in the backrest 3 of the seat 1. The linings of the backrest 3 have been modified to make it possible to rapidly release the two superposed straps 8, 9 and the airbag cushion 7 in the desired direction, that is to say to the front of the seat 1, to surround the passenger and avoid contact with the center pillar area of the bodyshell of the vehicle. To arrive at this result, a rigid rear shell 31 is pressed against a seat cushion 32 comprising the foam padding of the backrest 3, and a textile surrounding said foam. This seat cushion 32 comprises a main wall 33 continued to the front by two parallel lateral edges 34, 35. The shell 31 has a main wall 36 continued to the front by two parallel lateral edges 37, 38 and by an upper edge 39. These two lateral edges 34, 35 are substantially perpendicular to the main wall 36, the upper edge 39 continuing said main wall 36 and being inclined with respect thereto. The shell 31 is pressed against the seat cushion 32 of the backrest 3 such that:

its main wall 36 is pressed against the main surface 33 of the seat cushion 32 at the rear thereof, its two lateral edges 37, 38 clamp the two lateral edges 34, 35 of the seat cushion 32, thereby trapping the two superposed straps 8, 9 of each component 5, 6 of the airbag 4. FIG. 12 can be misleading in this regard, since in spite of the presence of the two lateral edges 37, 38 of the shell 31, it is still possible to see the two superposed straps 8, 9 of one component 5, 6 of the airbag 4. To alleviate this ambiguity, it is assumed that FIG. 12 shows said straps 8, 9 in a way seen through a lateral upright 37, 38 of the shell 31. The airbag cushion 7 and the two superposed straps 8, 9 of each component 5, 6 of the airbag 4 are accommodated between a lateral edge 34, 35 of the seat cushion 32 and a lateral edge 37, 38 of the shell 31. The superposed straps 8, 9 are sewn to an outer flank of the airbag cushion 7 and are thus the first to be discharged from the backrest 3, even though they are connected to the airbag cushion 7, in the event of an impact of the vehicle against an external obstacle.

By virtue of the particular configuration of the shell 31 and the sensible placement of the airbag cushion 7 and the two superposed straps 8, 9 between a lateral edge 34, 35 of the seat cushion 32 and a lateral edge 37, 38 of said shell 31, said airbag cushion 7 and said two superposed straps 8, 9 will deploy to the front of the backrest 3, as embodied by the arrow 40 in FIGS. 10 and 11. Such an arrangement of these various elements prevents any transverse deployment, that is to say along a transverse axis Y of the vehicle, of the airbag cushion 7 and the two associated superposed straps 8, 9.

With reference to FIGS. 13 to 20, a second particular feature of a seat 1 according to the invention, in addition to the fact that it fully integrates two components 5, 6 of an airbag 4 which perform well, is that it fully integrates a seat belt 50. Specifically, a seat belt for a passenger seat or a driver's seat usually comprises a fixing point for fixing to a center pillar on one bodyshell side. To produce a vehicle seat 1 according to the invention, this fixing point has been relocated to the off-center upper area 51 of the structure of the backrest 3.

With reference to FIGS. 16, 17 and 18, the backrest 3 of a seat 1 according to the invention comprises a main front surface 52, which is part of the main wall 33 of the seat cushion 32 and against which the back of an occupant who would be seated on said seat 1 is intended to rest, and the two lateral uprights 34, 35 of said seat cushion 32 framing said main surface 52 and being slightly inclined with respect thereto. It should be noted that these two lateral uprights 34, 35 designate the two lateral edges 34, 35 of the seat cushion 32 that were introduced above. In this way, these two lateral uprights 34, 35 are intended to laterally retain this occupant's back. During the manufacture of this seat, one of the two lateral uprights 34, 35 was shortened to be able to integrate a hollow front casing 55 at one end of this lateral upright 34, 35, such that the total length of the shortened lateral upright 34, 35 and the hollow front casing 55 is equal to the total length of the other lateral upright 34, 35.

With reference to FIGS. 16, 17 and 18, the hollow front casing 55 is thus located in the upper area 51 of the structure of the backrest 3 and is offset in relation to the main front surface 52. For esthetic reasons, the hollow front casing 55 constitutes an ideal continuation of the shortened lateral upright 34, 35 at the end of which it has been fixed, such that the overall geometry of the assembly formed by said shortened lateral upright 34, 35 and said casing 55 is identical to the shape of the other lateral upright 34, 35. The result of this is that the backrest 3 of the seat 1 has perfect symmetry in relation to these two lateral uprights 34, 35. With preference, the front casing 55 has a rounded shape which does not have a projecting edge corner in order to not injure an occupant of the vehicle or adversely affect the esthetics of the seat 1.

With reference to FIG. 19, the hollow front casing 55 delimits a receiving portion which is intended to accommodate an electric retractor 56 for the seat belt 50, and thus embodies the relocation of the fixing point for said seat belt 50 which is on the center pillar in some more conventional vehicles. This retractor 56 is fixed to the structure of the backrest 3.

With reference to FIGS. 16, 17, 18 and 20, the front casing 55 has a front face 57 provided with an opening in the shape of a cross comprising a slot 58 and a vertical secondary slot, said slot 58 being intended for the passage of a portion 59 of the seat belt 50 that is wound around the electric retractor 56 placed in the front casing 55. The slot 58 is substantially rectilinear and preferably extends in a horizontal direction. The vertical secondary slot leads into the horizontal slot 58, and makes it possible to insert the seat belt into the front casing 55. The portion 59 of the seat belt 50 has a width less than the length of the slot 58, and can thus emerge from said slot 58 with limitation of the play therewith, so as to stabilize the position of the portion 59 emerging from the hollow casing 55 and thus make it easier to handle the seat belt 50, 59. By virtue of the presence of the slot 58, the portion 59 of the seat belt will be able to descend along a lateral upright 34, 35 of the backrest 3 without ever interfering with the superposed straps 8, 9 of a component 5, 6 of the airbag 4 passing between one of said lateral uprights 34, 35 of the seat cushion 32 and a lateral edge 37, 38 of the shell 31.

With reference to FIGS. 13, 14, 15, the upper edge 39 of the shell 31 is placed above and in contact with an upper wall 60 of the hollow casing 55 accommodating the electric retractor 56 for the seat belt 50. This upper edge 39 delimits, with the hollow front casing 55, the receiving portion in which the retractor 56 is positioned. This upper wall 60 comprises a groove 61 intended for the passage of the two superposed straps 8, 9 of one of the two components 5, 6 of the airbag 4. The width of this groove 61 is slightly greater than the width of said two superposed 8, 9 straps 8, 9, so as to allow them to be accommodated in the groove 61 without creating significant play. The upper edge 39 of the shell 31 is sufficiently elongate to be able to just about fully cover this groove 61, thus concealing the presence of the two superposed straps 8, 9 in said groove 61. This upper edge 39 of the shell 31, by covering this groove 61 as accurately as possible, will allow said two superposed straps 8, 9 accommodated in said groove 61 to come out of said groove 61 before being expelled to the front of the backrest 3 in the event of an accidental impact of the vehicle against an external obstacle. Specifically, in the event of such an impact, the airbag cushion 7 of each component 5, 6 of the airbag 4 will inflate as it comes out of the backrest 3 to the front, pulling the two superposed straps 8, 9 sewn to said airbag cushion 7 along with it. The two initially superposed straps 8, 9 will deploy to the front of the backrest 3 and separate from one another, under the influence of the inflating airbag cushion 7. To summarize, the shell 31 added to the backrest 3 allows the straps 8, 9 sewn to the airbag cushion 7 to be able to come out to the front from the two sides of the backrest 3 and to be able to come out to the front in the upper area 51 of said backrest 3.

A vehicle seat 1 according to the invention thus has the following twofold particular feature:

having an airbag 4 in the form of two components 5, 6 each having at least two straps 8, 9 and an airbag cushion 7 to which said straps 8, 9 are sewn. In this way, in the event of an impact of the vehicle against an external obstacle, the two components 5, 6 of the airbag deploy to the front by being guided by the straps 8, 9 such that the two airbag cushions 7, once deployed, form a continuous band completely surrounding a person who would be seated on the seat 1. By virtue of the presence of this continuous bulge, this person will be protected with a maximum level of safety. It should be noted that the airbag 4 is fully integrated in the seat 1, fully integrating a seat belt 50 having an electric retractor 56 accommodated in a casing 55 placed in an off-center upper area 51 of the backrest 3.

The seat 1 is designed such that the seat belt 50 does not impede potential deployment of the two components 5, 6 of the airbag 4 in the event of an impact of the vehicle against an external obstacle, and such that the straps 8, 9 of the airbag 4 do not hinder the use and operation of the seat belt 50. Such a seat integrates a complete and autonomous protection system by way of the presence of the two components 5, 6 of the airbag and the seat belt 50, making it possible to ensure maximum protection for a person who would be seated on said seat irrespective of the positioning and orientation of this seat 1 within the vehicle.

The invention claimed is:

1. A vehicle seat comprising:

a structure of a backrest, a structure of a seat pan having an anti-submarining hump, and an airbag having two components placed on sides of said seat configured to be on either side of an individual who would be seated thereon, wherein each component of the airbag comprises an airbag cushion and at least one strap sewn to said airbag cushion, said component being configured to deploy toward the front of the seat in the event of an impact of the vehicle, such that said components are configured to completely surround the individual, said at least one strap of each component has a top fixing point for fixing to an upper area of the structure of the backrest and a bottom fixing point for fixing to the anti-submarining hump of the structure of the seat pan, and said at least one strap of each component is routed along one side of the structure of the backrest and along one side of the structure of the seat pan, the structure of the backrest comprises a seat cushion and a rigid shell surrounding said seat cushion and being open at the front, such that said at least one strap of each component passes on one side of the structure of the backrest between said seat cushion and said rigid shell, the seat comprising a seat belt fully integrated therein and provided with a retractor fixed to the structure of the backrest and placed inside a receiving portion delimited by a front casing located in an upper area of said structure of the backrest, the rigid shell at least partially covering said front casing, thereby forming a space between them to enable the passage of said at least one strap of one of the two components in the upper area of the structure of the backrest, said shell delimiting said receiving portion to the rear.

2. The vehicle seat as claimed in claim 1, wherein the shell comprises a rear wall configured to be placed against a rear surface of the seat cushion, two lateral edges configured to be placed against two lateral edges of the seat cushion, thereby surrounding said at least one strap of each component, and an upper edge configured to be placed on the front casing that encloses the retractor for the seat belt, creating a passage for said at least one strap of one of the two components in the upper area of the structure of the backrest.

3. The vehicle seat as claimed in claim 1, wherein the casing of the seat belt comprises a groove configured for the passage of said at least one strap of one of the two components, and the shell comprises a flat segment covering said groove in which said at least one strap is placed.

4. The vehicle seat as claimed in claim 3, wherein a width of the groove is slightly greater than a width of said at least one strap such that said at least one strap is placed in said groove with a minimum of play.

5. The vehicle seat as claimed in claim 1, wherein the backrest comprises a main surface against which an occupant's back is to rest, and two lateral uprights framing said main surface and configured to laterally hold this occupant's back, and the front casing is located in an upper area of one of the two lateral uprights.

6. The vehicle seat as claimed in claim 5, wherein the lateral upright in which the front casing is located was shortened beforehand such that the total length of said upright and said front casing is equal to the total length of the other upright.

7. The vehicle seat as claimed in claim 1, wherein the front casing has a front face, and said front face has an opening configured to allow a portion of the seat belt to exit said front casing to the front.

8. The vehicle seat as claimed in claim 7, wherein the opening takes the shape of a cross, comprising a slot of which a length is greater than a width of the seat belt portion emerging from the front casing to allow said portion to emerge from said slot.

9. The vehicle seat as claimed in claim 1, wherein the front casing is closed such that the retractor for the seat belt is not visible from outside the seat.

10. A vehicle comprising:
the vehicle seat as claimed in claim 1.

* * * * *